United States Patent [19]

Torras

[11] Patent Number: 4,515,392
[45] Date of Patent: * May 7, 1985

[54] SLOPE MOWER

[75] Inventor: Robert M. Torras, Brunswick, Ga.

[73] Assignee: Kut-Kwick Corporation, Atlanta, Ga.

[*] Notice: The portion of the term of this patent subsequent to Jun. 12, 2001 has been disclaimed.

[21] Appl. No.: 618,428

[22] Filed: Jun. 8, 1984

Related U.S. Application Data

[63] Continuation of Ser. No. 385,817, Jun. 7, 1982, Pat. No. 4,453,739.

[51] Int. Cl.³ .............................................. B60R 27/00
[52] U.S. Cl. ........................................ 280/755; 188/5
[58] Field of Search ................... 280/755, 758; 188/5, 188/6; 212/189; 298/17 SG

[56] References Cited

U.S. PATENT DOCUMENTS

| | | | |
|---|---|---|---|
| 1,372,396 | 3/1921 | Blackburn | 280/755 |
| 1,609,797 | 12/1926 | Chun Fat | 280/755 |
| 2,549,166 | 4/1951 | Brandt | 280/755 X |
| 4,093,259 | 6/1978 | Stedman | 280/755 |

FOREIGN PATENT DOCUMENTS 91231  3/1958  Norway ............................ 280/755

Primary Examiner—Joseph F. Peters, Jr.
Assistant Examiner—Michael Mar
Attorney, Agent, or Firm—Jones & Askew

[57] ABSTRACT

A tractor or similar vehicle which cannot traverse an uphill slope exceeding a certain critical angle of attack. The center of gravity of the vehicle is chosen so that the vehicle is in tipping equilibrium at a certain critical angle of attack which is substantially less than the maximum slope which the vehicle otherwise can climb. A tail plate is mounted behind the rear axle of the vehicle to contact the travel path and limit the maximum amount of tipping, so that the front end of the vehicle can rise no more than a limited amount. A limited extent of tipping thus occurs whenever the vehicle operator attempts to exceed the critical angle of attack, providing a relatively limited and non-violent tipping action which forces the vehicle operator to reduce the angle of attack.

4 Claims, 3 Drawing Figures

SLOPE MOWER

This application is a continuation of application Ser. No. 385,817 filed June 7, 1982, now U.S. Pat. No. 4,453,739.

FIELD OF THE INVENTION

This invention relates in general to tractors and similar vehicles, and relates in particular to such vehicles intended for operation along sloped paths such as hills, embankments, or the like.

BACKGROUND OF THE INVENTION

The potential hazards of operating vehicles such as tractors on steeply sloping surfaces has long been appreciated by those skilled in the art. Tractors utilized in farming operations or in highway right-of-way mowing, to name but two examples, frequently must travel along hillsides or other sloped paths where the tractor assumes an angle of attack with respect to the hill. This may take place either because the tractor is being driven more-or-less directly up the hill, or because the tractor is moving in a crabwise fashion across the hill to maintain a particular path of travel notwithstanding slippage down the slope. In either case, the front end of the tractor is elevated with respect to the back axle of the tractor, presenting an angle of attack with respect to horizontal. If this angle of attack exceeds some angle where the tractor's center of gravity moves behind the back axle, the tractor will overturn. Many serious and often-fatal accidents have occurred where tractor operators, whether through negligence or simple inattention, exceeded the maximum possible angle of attack for a particular tractor. The risk of overturn or tipping may be aggravated in many cases because such tractors typically are equipped with rear tires or relatively large diameter and/or ribbed or lugged treads capable of exerting substantial traction, especially on relatively soft unpaved surfaces. Such tractors frequently have sufficient power and traction to climb hills steeper than the angle at which the tractor will overturn.

Prior art attempts to overcome the foregoing problem generally have centered around preventing its occurrance, and have been less than satisfactory in many applications. The usual prior-art approach is to move the center of gravity of the tractor further in front of the back axle, thereby increasing the maximum angle of attack before overturning becomes theoretically possible. While this increased maximum angle of attack delays the onset of overturning, the increased maximum angle of attack is such that the front end of the tractor already is well above the normal level position and the tractor operator is leaning back at an unnatural attitude when the tractor reaches this maximum angle. The overturning or tipping movement at this point can be sudden and drastic, frightening the tractor driver and throwing him further off balance, and preventing any possible corrective action which the driver might take to prevent overturning when an incipient maximum angle of attack is reached.

Other approaches of the prior art have included mounting roll bars or cages about the operator's position on the tractor, in an attempt to protect the operator if overturning takes place. While these latter measures are commendable, they fail to address the basic problem, namely, how to avoid the onset of overturning in the first place.

SUMMARY OF INVENTION

Stated in general terms, a tractor designed according to the present invention has its center of gravity located so that the front end of the tractor lifts off a sloped path of travel when the tractor reaches a certain critical angle of attack selected to be substantially less than the maximum angle which the tractor otherwise is capable of climbing. The tractor is equipped with structure which limits the distance which the tractor front end can lift from the ground during this controlled and limited tipping. The limited amount of front-end lifting, occurring at a selected critical angle of attack considerably less than the maximum possible angle of attack for which tractors previously have been designed, causes front-end lifting to occur in a manner which is much less likely to unnerve or frighten the tractor driver, and enabling the driver to maintain control of the tractor. Moreover, the present invention assures that the limited tipping action takes place at a safe angle of attack predetermined to allow a significant safety margin before overturning can occur. The driver thus can reduce the angle of attack below the selected critical angle by angling his machine more toward the horizontal to move the effect of the center of gravity forward, thereby recovering from the artificially induced tipping.

Stated somewhat more specifically, the present invention involves relocating the point at which the center of gravity passes behind the rear axle of the tractor, thereby producing a tipping-up action that will occur while still on a safe angle of attack up a slope. The tractor also is equipped with a tail plate which extends behind the back axle, and which provides adequate ground clearance while being positioned to support the rear of the vehicle in a manner that controls the maximum amount the front end can lift off the ground. This predetermined maximum lift-up distance prevents a violent tip-up action but allows adequate lifting at the front end to discourage further ascent on the slope without first changing the angle of attack, which is followed by a recovery where the front end returns to the ground.

Accordingly, it is an object of the present invention to provide an improved tractor.

It is another object of the present invention to provide a tractor which can safely traverse sloped surfaces at an angle of attack along the slope.

It is a further object of the present invention to provide a tractor which is limited to a certain critical angle substantially less than the maximum possible angle of attack, when attempting to traverse a sloped path.

The foregoing and other objects and advantages will become more readily apparent from the following discussion of a preferred embodiment.

DESCRIPTION OF PREFERRED EMBODIMENT

Figure 1:
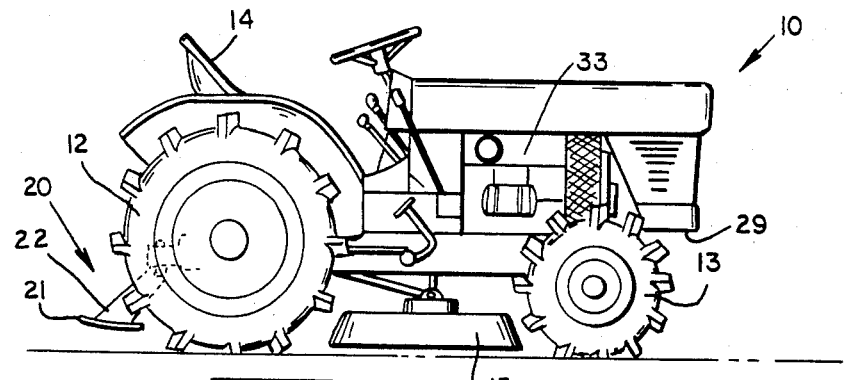
FIG. 1 is a plan view of a tractor equipped according to a disclosed embodiment of the present invention.

Turning first to FIG. 1, there is shown generally at 10 a tractor equipped according to the present invention. The tractor 10, which to the casual observer may resemble a conventional tractor, includes a power-driven back axle 11 mounting conventional wheels including ribbed back tires 12 for increased traction on unpaved surfaces. The tractor also has front wheels 13 which may be of conventional design. A driver's seat 14 is positioned approximately above the back axle 11. A grass cutter 15 is shown suspended beneath the tractor between the front and back wheels, and this grass cutter may be of conventional design. It will also be understood that the grass cutter 15 could be in front of the tractor, in accordance with conventional design. While the disclosed tractor 10 is shown and described in the context of a tractor particularly configured for grass-cutting applications, it will become apparent that tractors according to the present invention alternatively are useful for farming or other applications. Those skilled in the art will realize that such tractors may be equipped with a variety of implements, either mounted on the tractor itself as in the case of the grass cutter 15 or drawn by the tractor through a suitable hitch.

Figure 2:
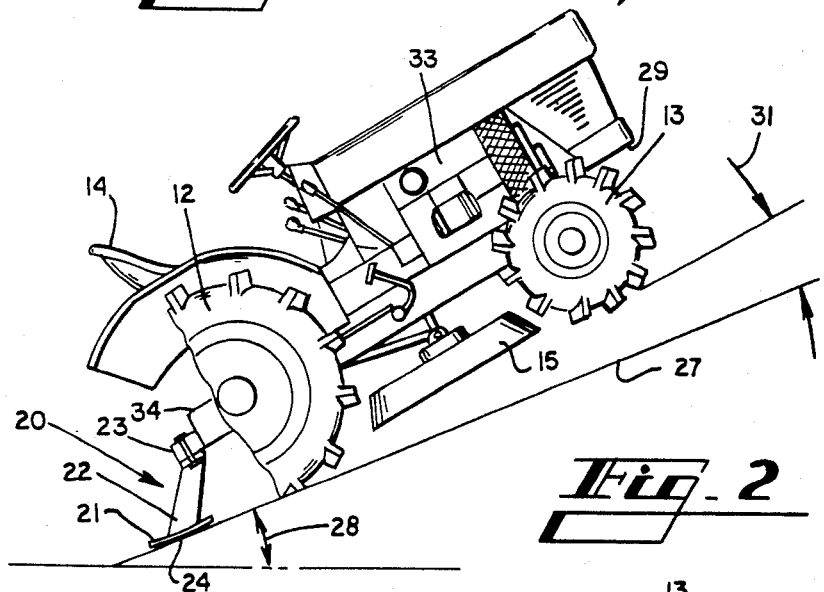
FIG. 2 is a plan view of the disclosed embodiment, partially broken away for illustration, shown at a critical angle along a slope.
Figure 3:
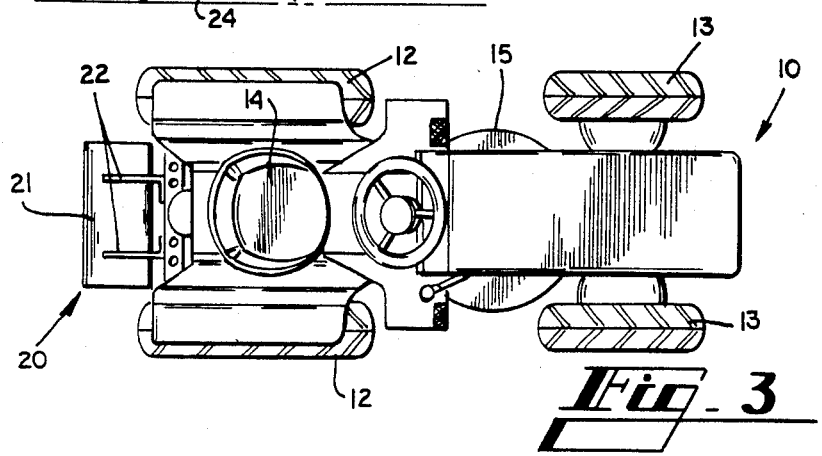
FIG. 3 is a plan view of the disclosed embodiment.

Attached to the back of the tractor behind the back axle 11 is the tail plate assembly 20, best seen in FIGS. 2 and 3. The tail plate assembly 20 includes a tail plate 21 which preferably spans an appreciable portion of the width of the tractor as best seen in FIG. 3, and the tail plate supports 22 extending upwardly and forwardly from the top surface of the tail plate. The upper ends of the tail plate supports 22 are securely attached to the tractor 10 at the crossbar 23, which in turn is affixed to the tractor frame at a location behind the back axle 11 of the tractor. The crossbar 23 may form part of an existing drawbar on the tractor 10, or alternatively may be a separate member intended primarily for attaching the tail plate assembly 20 to the tractor.

Because the tail plate 21 and its associated mounting structure must function to limit the maximum amount of tipping of the tractor as described below, this tail plate and its structure must be fabricated of sufficiently rugged material for the purpose. Moreover, the lateral breadth and overall ground-contacting bottom surface area of the tail plate 21 should be sufficiently large so that minor depressions or irregularities in the travel path 24 (FIG. 2), immediately beneath the tail plate 21, effectively are bridged by the tail plate if the tractor tips as shown in that figure. Although the tail plate 21 of the disclosed embodiment is shown as a single plate of rectangular plan-form and having a slight curvature as shown in FIGS. 1 and 2, other embodiments of tail plate may be provided. For example, an alternative tail plate construction could have several smaller individual ground-engageable contacting pads or surfaces in place of the single plate 21 shown. In any case, the underside of the tail plate 21 should provide sufficient ground clearance to avoid ground contact during normal operation of the tractor 10, as shown in FIG. 1.

The center of gravity of a vehicle such as the tractor 10 is, as known to those skilled in the art, located at some point along the longitudinal axis of the vehicle, it is the location of this center of gravity, together with other factors such as the distance between the center of gravity and the back axle 11, and the radius of the back tires 12, that determine the maximum slope the tractor can traverse before gravitational force, which may be considered as an imaginary vertical force vector acting through the center of gravity, coincides with the back axle of the vehicle. When this coincidence occurs, the vehicle is in equilibrium about the back axle and any increase in the angle of attack or other backward force applied to the tractor will cause the tractor to overturn about its back tires.

In past practice as discussed above, the conventional design calls for moving the center of gravity as far forward of the back axle as practicable, thereby providing an increased maximum angle of attack before the tractor can overturn. With the present tractor 10, however, the center of gravity is deliberately chosen so that the front end 29 lifts off the ground when the tractor attempts to climb a sloping path 27 (FIG. 2) exceeding a certain critical angle of attack 28. This critical angle of attack 28 is deliberately chosen to allow a safety factor when tipping occurs, thereby preventing the violent tipping action which often caused prior-art tractors to overturn and allowing tipping to take place in a manner from which the driver can more readily recover. By way of example only, the critical angle of attack 28 in the disclosed embodiment is chosen to be approximately 30°, meaning that the tractor 10 commences tipping backwardly about the back axle 11 whenever the tractor driver attempts to negotiate a slope 27 at an angle of attack exceeding approximately 30°. It should be understood that this critical angle of attack can be reached either by driving the tractor straight up a slope at the critical angle, or by driving the tractor crabwise along a slope which exceeds the critical angle, the crab angle being such that the effective angle of attack of the tractor on the slope exceeds the critical angle 28.

When the tractor 10 exceeds the critical angle 28 as described above, the front end 29 of the tractor rises above the slope 27 by a relatively limited distance 31, FIG. 2, at which point the tail plate 21 contacts the slope to arrest further tipping action of the tractor. Assuming a condition of complete equilibrium at this point, the tractor assumes the position shown in FIG. 2 with the front end 23 elevated a limited distance above the slope 27. By way of example only, the tail plate assembly 20 is designed and located relative to the back axle 11 so that the front end 29 of the tractor raises no more than about 14 to 18 inches before the tail plate 21 arrests further tipping.

With the tractor in the limited-tip position shown in FIG. 2, the operator of the tractor learns that the critical angle has been reached, and cannot further travel along the slope 27 at an angle of attack exceeding the critical angle 28. The tractor operator must reduce the angle of attack, which can be done by backing down the slope and then approaching the slope at a reduced angle of attack. Some tractors are capable of independently driving the rear wheels, either by separate clutches in the drive train or by individually braking either wheel, and with such tractors the operator may be able to reduce the angle of attack simply by applying power to the uphill back wheel while braking or declutching or reversing the downhill wheel, thereby effectively turning the tractor while its front wheels 13 are off the ground.

It should now be apparent that the center of gravity of the tractor 10 is adjusted to bring about tipping equilibrium at a critical angle 28 which is substantially less than the typical tipping angle designed into tractors and the like. This adjusted center of gravity can be accomplished either by positioning the relatively heavy components (such as the engine 33 and related drive train components) toward the back axle 11, or by moving a portion of the tractor's mass behind the back axle 11 of the tractor. Moreover, additional mass such as the weight indicated generally at 34 can be added to the tractor behind the back axle, thereby providing a tipping movement which partially offsets the weight of components necessarily located in front of the axle. It will be evident that the particular choice of expedients to provide the necessary center of gravity for achieving the critical angle of attack 28 depends on several factors, among which are the overall configuration of the tractor or other vehicle, the diameter of vehicle rear wheels, and the weight of the vehicle and any implements such as the grass cutter 15 attached thereto. The particular choice and implementation of expedients for achieving the desired center of gravity in any particular case is well within the ability of one of ordinary skill, and may well be determined by whether the vehicle is initially designed with the objects of the present invention in mind, or whether an existing vehicle is being retrofitted to achieve these objects.

It should also be apparent that the foregoing relates to but one embodiment of the present invention and that numerous changes and modifications may be made therein without departing from the spirit and scope of the invention as defined in the following claims.

I claim:

1. In a tractor vehicle intended for moving or otherwise normally functioning on sloped surfaces while traveling on the sloped surface, the vehicle having a rear axle, front wheels, and having a normal center of gravity forward of the rear axle at a location which establishes the proportion of vehicle weight on the front wheels and thereby normally establishes the maximum angle of forward ascent the vehicle can reach when moving up a sloped surface before tipping back over the rear axle, the method comprising the steps of:

providing weight means on said vehicle in back of said normal center of gravity so as to relocate the center of gravity of the vehicle toward the rear axle at a new center of gravity aft of said normal center of gravity, which allows the front wheels of the vehicle to lift away from the sloped surface when the vehicle exceeds a critical angle of forward ascent substantially less than said maximum angle of forward ascent which the normal vehicle otherwise could reach, thereby causing the front of the vehicle to lift away from the sloped surface in a relatively gradual and controlled manner when the vehicle exceeds said critical angle of forward ascent, so as to signal to the vehicle operator that the critical angle of forward ascent has been reached and to inhibit the normal functioning of the vehicle until the angle of forward ascent is reduced below the critical angle, whereby the vehicle returns to a normal stance and functions with all wheels on the sloped surface; and limiting the maximum amount of tipping back over the rear axle which the vehicle with said relocated center of gravity is capable of undergoing when said critical angle of forward ascent is exceeded, so that the front wheels of the vehicle can lift no more than a limited amount, assuring that the vehicle cannot tip back over its rear axle and overturn when exceeding the critical angle of forward ascent and while the normal functioning of the vehicle is inhibited, thereby enabling the driver of the vehicle to regain contact between the front wheels of the vehicle and the sloped surface by reducing the angle of forward ascent of the vehicle on the sloped surface, and allowing the vehicle thereafter to resume its normal function on the sloped surface.

2. In a slope mowing vehicle of the kind intended for mowing or otherwise normally functioning on sloped surfaces while traveling on the sloped surface, the vehicle including a back axle and front wheel means and normally constructed to be capable of reaching a maximum angle of forward ascent on the sloped surface, and with the vehicle normally constructed to place its center of gravity at a point in front of the back axle which increases the weight on the front wheel means and thereby increases the maximum angle of forward ascent the vehicle can reach on the sloped surface before the vehicle can tip up and overturn around the back axle, whereupon such tipping normally occurs in a sudden and uncontrollable manner, the improvement therein of reducing the maximum angle of attack which the mowing vehicle can reach when ascending a sloped surface and comprising in combination:

weight means associated with said vehicle behind said normal center of gravity of said vehicle so as to relocate the center of gravity of said vehicle toward said back axle at a new center of gravity aft of said normal center of gravity;

said relocated center of gravity causing the front wheel means of the mowing vehicle to lift away from the sloped surface in a relatively gradual and controlled manner when the mowing vehicle exceeds a certain critical angle of forward ascent which is substantially less than said maximum angle at which a normal mowing vehicle otherwise could ascend, signaling to the vehicle operator that the critical angle of forward ascent has been exceeded and inhibiting the normal functioning of the vehicle until the angle of forward ascent is reduced below the critical angle, whereby the vehicle returns to a normal stance on the sloped surface and functions with its front wheel means on the sloped surface; and means carried by said vehicle to engage the surface of travel of said vehicle when said vehicle with said relocated center of gravity undergoes a predetermined amount of tipping rotation about its back axle, thereby preventing further tipping about said back axle so that the front wheel means of the vehicle can lift no more than a predetermined amount away from the sloped surface, inhibiting normal functioning and signaling to the vehicle operator that the maximum safe angle of ascent has been reached, so that the front end of said vehicle with the relocated center of gravity first lifts from the sloped surface in a relatively gradual and controlled manner as said vehicle exceeds a relatively safe critical angle of forward ascent predetermined to allow a substantial safety margin before overturning of the vehicle can occur, and so that said surface engaging means limits the amount of tipping of the vehicle about its back axle, thereby enabling the driver of the vehicle to regain uninhibited functioning of the vehicle by reducing the angle of forward ascent on the sloped surface to an angle less than said critical angle, allowing the vehicle thereafter to function without inhibition on the sloped surface.

3. The vehicle as in claim 2, wherein:

said surface engaging means comprises a surface engaging member carried by said vehicle behind said back axle in predetermined spaced apart relation to the back axle and in predetermined elevation above the surface, so as to engage the surface when the front wheel means of the vehicle lifts said predetermined amount from the sloped surface, thereby preventing further tipping about the back axle.

4. The vehicle as in claim 2, wherein:
said relocated center of gravity is fixedly located with respect to said back axle.

* * * * *